(12) United States Patent
Yamahira et al.

(10) Patent No.: US 11,403,747 B2
(45) Date of Patent: Aug. 2, 2022

(54) FINE RATIO MEASURING DEVICE AND FINE RATIO MEASURING SYSTEM

(71) Applicant: JFE Steel Corporation, Tokyo (JP)

(72) Inventors: Naoshi Yamahira, Tokyo (JP); Takahiro Nishino, Tokyo (JP); Takehide Hirata, Tokyo (JP); Kazuro Tsuda, Tokyo (JP); Toshiki Tsuboi, Tokyo (JP)

(73) Assignee: JFE Steel Corporation, Tokyo (JP)

( * ) Notice: Subject to any disclaimer, the term of this patent is extended or adjusted under 35 U.S.C. 154(b) by 782 days.

(21) Appl. No.: 16/341,524

(22) PCT Filed: Nov. 29, 2017

(86) PCT No.: PCT/JP2017/042709
§ 371 (c)(1),
(2) Date: Apr. 12, 2019

(87) PCT Pub. No.: WO2018/101287
PCT Pub. Date: Jun. 7, 2018

(65) Prior Publication Data
US 2019/0370953 A1    Dec. 5, 2019

(30) Foreign Application Priority Data

Nov. 30, 2016   (JP) .............................. JP2016-231969

(51) Int. Cl.
*C21B 5/06*     (2006.01)
*G06T 7/00*     (2017.01)
(Continued)

(52) U.S. Cl.
CPC ............ *G06T 7/0004* (2013.01); *C21B 5/006* (2013.01); *C21B 5/007* (2013.01); *C21B 5/008* (2013.01);
(Continued)

(58) Field of Classification Search
CPC .. G02B 27/0955; G02B 5/30; G02B 27/0927; G02B 27/0944; G02B 1/04; G02B 5/20;
(Continued)

(56) References Cited

U.S. PATENT DOCUMENTS 4,288,162 A *  9/1981  Sakamoto .......... G01N 15/0227
356/335
2004/0246367 A1  12/2004  Yoshida
(Continued)

FOREIGN PATENT DOCUMENTS

AU        2012283710 B2 *  8/2015
CN        1573283 A        2/2005
(Continued)

OTHER PUBLICATIONS

The Office Action dated Sep. 17, 2021, of counterpart Chinese Application No. 201780063845.7, along with a Concise Statement of Relevance of the Office Action in English.
(Continued)

*Primary Examiner* — Michael P Stafira
(74) *Attorney, Agent, or Firm* — DLA Piper LLP (US)

(57) ABSTRACT

A fine ratio measuring device that measures the fine ratio of fines adhering to the surface of the material in the form of lumps includes: an illumination unit that illuminates the material in the form of lumps; an imaging unit that captures an image of the material in the form of lumps and produces image data; and an arithmetic unit including a computation unit that computes a characteristic quantity of the image data produced by the imaging unit and a conversion unit that converts the characteristic quantity computed by the computation unit to the fine ratio.

18 Claims, 6 Drawing Sheets

(51) Int. Cl.
*C21B 5/00* (2006.01)
*C21B 7/24* (2006.01)
*G01N 21/47* (2006.01)
*G01N 21/17* (2006.01)
*G01N 21/85* (2006.01)

(52) U.S. Cl.
CPC .......... *C21B 7/24* (2013.01); *G01N 21/4738* (2013.01); *G01N 2021/1765* (2013.01); *G01N 2021/8592* (2013.01)

(58) Field of Classification Search
CPC ........ G02B 1/02; G01N 21/35; G01N 23/223; G01N 2021/1734; G01N 2021/3595; G01N 2021/8845; G01N 21/359; G01N 21/75; G01N 21/85; G01N 21/8806; G01N 21/89; G01N 21/892; G01N 21/896; G01N 2223/652; G01N 2291/0289; G01N 2291/2632; G01N 29/043; G01N 33/02; G01N 21/3559; G01N 21/3563; G01N 21/65; G01N 21/73; G01N 21/8901; G01N 2021/845; G01N 2030/645; G01N 21/3103; G01N 21/55; G01N 21/95; G01N 21/958; G01N 2291/044; G01N 2291/048; G01N 2291/102; G01N 2333/904; G01N 2333/91142; G01N 2333/916; G01N 24/08; G01N 24/085; G01N 29/04; G01N 29/0645; G01N 29/11; G01N 29/228; G01N 29/275; G01N 29/28; G01N 29/30; G01N 29/32; G01N 29/4418; G01N 29/4427; G01N 29/4436; G01N 30/64; G01N 33/12; G01N 2021/6417; G01N 2021/6484; G01N 2021/8592; G01N 21/23; G01N 21/3581; G01N 21/3586; G01N 21/59; G01N 21/6445; G01N 21/645; G01N 21/94; G01N 21/9508; G01N 2223/071; G01N 2223/076; G01N 2223/3308; G01N 2223/623; G01N 2223/643; G01N 2223/645; G01N 27/04; G01N 29/069; G01J 3/108; G01J 1/58; G01J 3/02; G01J 3/0208; G01J 3/0218; G01J 3/44
See application file for complete search history.

(56) References Cited

U.S. PATENT DOCUMENTS

| | | | |
|---|---|---|---|
| 2005/0175231 | A1 | 8/2005 | Hirata et al. |
| 2013/0016356 | A1 | 1/2013 | Kendall |
| 2016/0153062 | A1 | 6/2016 | Yamahira et al. |
| 2021/0102885 | A1* | 4/2021 | Yamahira .......... G01N 15/0893 |

FOREIGN PATENT DOCUMENTS

| | | | | |
|---|---|---|---|---|
| CN | 1656371 | A | | 8/2005 |
| CN | 105308191 | A | | 2/2016 |
| EP | 0 391 530 | A2 | | 10/1990 |
| EP | 0391530 | A2 | | 10/1990 |
| EP | 3015853 | A1 | | 5/2016 |
| JP | H07-128214 | A | | 5/1995 |
| JP | H0748065 | B2 | * | 5/1995 |
| JP | H08184569 | A | * | 7/1996 |
| JP | 2000-329683 | A | | 11/2000 |
| JP | 2000329683 | A | * | 11/2000 |
| JP | 2001-337028 | A | | 12/2001 |
| JP | 2005-134301 | A | | 5/2005 |
| JP | 2005-172614 | A | | 6/2005 |
| JP | 2005-227107 | A | | 8/2005 |
| JP | 2006-201130 | A | | 8/2006 |
| JP | 2006-292500 | A | | 10/2006 |
| JP | 2008261642 | A | * | 10/2008 |
| JP | 2010-097379 | A | | 4/2010 |
| JP | 2013257188 | A | * | 12/2013 |
| JP | 2014-025720 | A | | 2/2014 |
| JP | 2014-038014 | A | | 2/2014 |
| JP | 2014-215217 | A | | 11/2014 |
| JP | 2015-124436 | A | | 7/2015 |
| JP | 2016029391 | A | * | 3/2016 |
| JP | 2016-141828 | A | | 8/2016 |
| JP | 5982532 | B1 | * | 8/2016 ............. G01N 15/14 |
| KR | 1997-0005501 | B | | 4/1997 |
| KR | 2012-0068189 | A | | 6/2012 |
| KR | 10-2013-0110597 | A | | 10/2013 |
| KR | 10-2016-0024946 | A | | 3/2016 |
| WO | 97/14950 | A1 | | 4/1997 |
| WO | WO-9714950 | A1 | * | 4/1997 ......... G01N 15/0227 |
| WO | WO-2011125927 | A1 | * | 10/2011 ............. G01B 11/08 |

OTHER PUBLICATIONS

Office Action dated Mar. 8, 2021, of counterpart Korean Application No. 10-2019-7010857, along with a Concise Statement of Relevance of Office Action in English.
The Extended European Search Report dated May 24, 2019, of counterpart European Application No. 17877269.5.
Office Action dated Aug. 5, 2020, of counterpart European Application No. 17877269.5.
The Office Action dated Mar. 2, 2022, of counterpart Chinese Application No. 201780063845.7, along with a Concise Statement of Relevance of the Office Action in English.
Office Action dated Dec. 16, 2020, of counterpart Chinese Application No. 201780063845.7, along with a Concise Statement of Relevance in English.
Office Action dated Jan. 11, 2021, of counterpart Korean Application No. 10-2019-7010857, along with a Concise Statement of Relevance in English.
Office Action dated Dec. 22, 2020, of counterpart European Application No. 17877269.5.
Office Action dated Mar. 10, 2020, of counterpart European Application No. 17877269.5.
The Grant of Patent dated Aug. 27, 2021, of counterpart Korean Application No. 10-2021-7016984, along with an English translation.
Office Action dated Jun. 15, 2020, of counterpart Korean Application No. 10-2019-7010857, along with a Concise Statement of Office Action in English.

* cited by examiner

FINE RATIO MEASURING DEVICE AND FINE RATIO MEASURING SYSTEM

TECHNICAL FIELD

This disclosure relates to a fine ratio measuring device for raw materials used for blast furnaces and a fine ratio measuring system.

BACKGROUND

In production facilities such as blast furnaces that use raw materials such as minerals, grain sizes of the raw materials affect operations of production processes. Therefore, to stabilize the production processes, it is necessary to obtain information about the grain sizes of the raw materials in advance. In particular, in a blast furnace, it is important to know the grain sizes of raw materials such as ore and coke, and it is also necessary to operate the blast furnace with attention to the fine ratios of fine-grained fines adhering to the raw materials to be charged into the blast furnace to ensure ventilation in the furnace. The fine ratio is the ratio of the mass of fines to the total mass charged.

To maintain ventilation in the blast furnace, it is important to provide spaces between lumps of the charged materials. When the charged materials contain a large amount of small lumps and fines, the spaces between the lumps of the charged materials are filled with the small lumps and fines, and the ventilation deteriorates. Therefore, the raw materials to be charged are sieved in advance, and only the lumps on the sieve are charged into the blast furnace. Generally, by performing sieving before charging into the blast furnace, the grain size of coke is often adjusted to 25 to 35 mm or more, and the grain size of sintered ore or iron ore is adjusted to 5 to 25 mm or more. However, it is difficult to completely remove the raw materials in the form of fines by a general sieving operation. In particular, fines adhering to lumps are charged together with the lumps into the blast furnace, and the lumps and the fines are separated in the blast furnace. Therefore, there is a need to know the amount of fines adhering to the lumps in advance so that the amount of fines charged into the blast furnace is reduced as much as possible.

The grain sizes of raw materials for a blast furnace and their fine ratios are conventionally analyzed by periodic sampling of the raw materials and sieving. However, the analysis is time consuming and, therefore, the raw materials conveyed cannot be analyzed in real time. To analyze the grain size of a raw material in real time, it is necessary to use a device capable of measuring the grain size of the raw material in real time during conveyance of the raw material using, for example, a conveyor. One of such devices is disclosed in Japanese Unexamined Patent Application Publication No. 2005-134301. In that device, a raw material on a conveyor that conveys the raw material is sampled. The sample is sieved using, for example, a robot, and the distribution of the grain size is measured automatically.

Devices capable of measuring the grain size of raw material in real time using, for example, a camera have been disclosed. Japanese Unexamined Patent Application Publication No. 2000-329683 discloses a method of detecting the grain size of a bulk raw material conveyed on a conveyor by capturing an image of the bulk raw material on the conveyor to produce image data, determining the distribution of brightness from the image data, and detecting the grain size of the bulk raw material using the maximum peak height in the brightness distribution.

Japanese Unexamined Patent Application Publication No. 2014-38014 discloses a paper fine adhering amount inspection device that measures the amount of paper fines in the form of particles adhering to cut surfaces of flat paper sheets using illumination light and imaging devices.

Japanese Unexamined Patent Application Publication No. 2015-124436 discloses a device that detects a material to be charged into a blast furnace. In that detection device, the water content of the material to be charged is detected from spectroscopic information obtained from reflected light in the near infrared range included in light reflected from the material to be charged into the blast furnace. The detection device detects the fine ratio in the material to be charged in real time by obtaining the relation between the moisture content of the material to be charged and the fine ratio of fines adhering to the material to be charged.

A problem with the device disclosed in JP '301 is that, when the frequency of sampling is excessively high, the operation process is delayed. Since the inspection is sampling inspection, there is a problem of sampling representativeness.

In the method disclosed in JP '683, a plurality of sets of data about the maximum peak height in a brightness distribution measured for a bulk raw material with a known grain size are prepared in advance for different grain sizes. The grain size of a bulk raw material is detected by comparing the maximum peak height in a brightness distribution computed from measured image data to the prepared maximum peak height data. That method does not quantitatively measure the fine ratio of fines, and it is not stated that the fine ratio of fines adhering to a material in the form of lumps can be measured. Therefore, a problem with the method described in JP '683 is that the fine ratio of fines adhering to the surface of a material in the form of lumps cannot be measured quantitatively.

In the device disclosed in JP '014, low-brightness computation areas are defined at positions in the left and right directions of a pixel to be inspected, and the positions of adhering paper fines are determined based on brightness differences in the left and right low-brightness computation areas. However, as for fines adhering to a material in the form of lumps, the differences in brightness cannot be determined because the surface of the material in the form of lumps is rough. Another problem with that device is that, since the illumination light is blocked by the material in the form of lumps, the fine ratio of fines adhering to the material in the form of lumps cannot be measured quantitively.

The device described in JP '436 measures the fine ratio using spectroscopic information about near infrared light included in the light reflected from the material to be charged. To obtain the information in the near infrared range, a strong light source is necessary. When a strong light source is used to irradiate the material to be charged, the amount of reflected light in the near infrared range can be increased. However, a problem in there is that heat is generated in the material to be charged and affects operation of the production process. In the device described in JP '436, the moisture content of the material to be charged is detected from the spectroscopic information about the near infrared radiation, and the fine ratio in the material to be charged is detected from the relation between the moisture content of the material to be charged and the fine ratio in the charged material. However, as will be described later, the correlation between the moisture content of the material to be charged and the fine ratio in the material to be charged is not high, and a problem is that the accuracy of the measurement of the fine ratio is low.

It could therefore be helpful to provide a fine ratio measuring device and a fine ratio measuring system that can accurately measure in real time the fine ratio of fines adhering to the surface of a material in the form of lumps used as a raw material for an operation process in, for example, a blast furnace.

SUMMARY

We thus provide:
(1) A fine ratio measuring device that measures a fine ratio of fines adhering to the surface of a material in the form of lumps, the fine ratio measuring device including: an illumination unit that illuminates the material in the form of lumps; an imaging unit that captures an image of the material in the form of lumps and then produces image data; and an arithmetic unit that computes a characteristic quantity of the image data produced by the imaging unit and converts the characteristic quantity to the fine ratio.
(2) The fine ratio measuring device according to (1), wherein the characteristic quantity is an average brightness obtained by averaging the brightness of pixels in the image data.
(3) The fine ratio measuring device according to (1), wherein the characteristic quantity is a modal brightness that is a most frequent brightness in pixels in the image data.
(4) The fine ratio measuring device according to any one of (1) to (3), wherein the illumination unit includes a plurality of light sources with different illumination directions.
(5) The fine ratio measuring device according to (4), wherein the imaging unit captures an image of the material in the form of lumps each time the material is illuminated using the plurality of light sources from at least one of the directions thereof to thereby produce a plurality of sets of image data, and wherein the arithmetic unit produces maximum brightness image data and computes the characteristic quantity using the maximum brightness image data, the maximum brightness image data including data about maximum brightness pixels in the plurality of sets of image data, each of the maximum brightness pixels being selected from pixels produced by receiving light from an identical position of the material in the form of lumps.
(6) A fine ratio measuring system including: the fine ratio measuring device according to any one of (1) to (5); and a conveyor that conveys the material in the form of lumps, the fine ratio measuring device being disposed above the conveyor, wherein the fine ratio measuring device is used to measure the fine ratio of the fines adhering to the surface of the material in the form of lumps.

By using the fine ratio measuring device and the fine ratio measuring system, the fine ratio of fines adhering to the surface of the material in the form of lumps can be measured with high accuracy in real time without generation of heat in the material in the form of lumps. Therefore, in a production process in, for example, a blast furnace, the fine ratio of, for example, coke fines adhering to the surface of coke used as a raw material can be obtained before the raw material is charged into the blast furnace, and this can contribute to stable operation of the production process.

Figure 1:
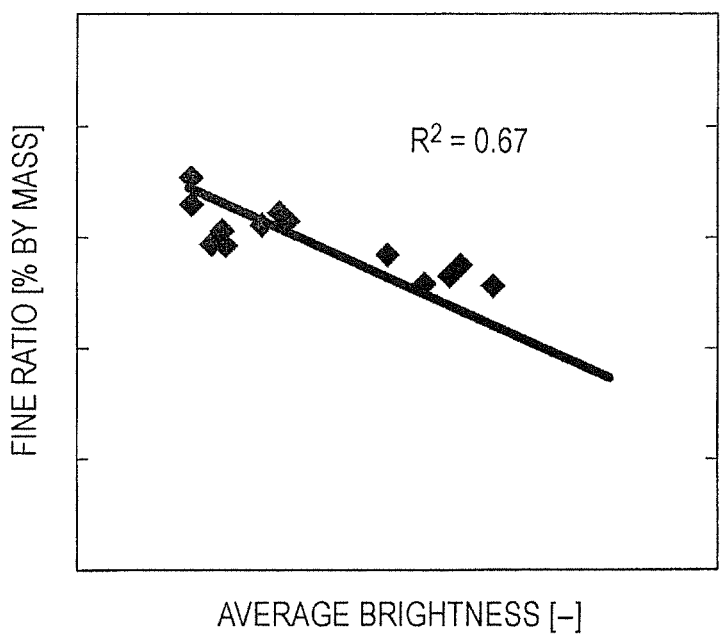
FIG. 1 is a graph showing the relation between the average brightness of a material in the form of lumps with fines adhering thereto and a fine ratio.

REFERENCE SIGNS LIST 10 fine ratio measuring system
12 fine ratio measuring device
14 conveyor
16 imaging unit
18 illumination unit
20 arithmetic unit
22 coke
24 hopper
26 sieve
30 light source
32 light source
34 light source
36 light source
40 illumination unit
42 arrow
44 shadow

DETAILED DESCRIPTION

We found that there is a correlation between the fine ratio of fines having a grain size of 1 mm or less and adhering to a material in the form of lumps and an average brightness in image data obtained by capturing an image of the material in the form of lumps. First, a description will be given of the high correlation between the average of brightness values in the image data obtained by capturing an image of the material in the form of lumps and the fine ratio of fines of 1 mm or less adhering to the material in the form of lumps.

FIG. 1 is a graph showing the relation between the average brightness of the material in the form of lumps with fines adhering thereto and the fine ratio. FIG. 1 shows results obtained using, as the material in the form of lumps, lump coke having a grain size of 35 mm or more with coke fines with a grain size of 1 mm or less adhering to its surface. The vertical axis represents the fine ratio (% by mass) of the coke fines of 1 mm or less adhering to the lump coke, and the horizontal axis represents the average brightness of the image data obtained by capturing an image of the lump coke with the coke fines of 1 mm or less adhering thereto. The lump coke with a grain size of 35 mm or more was prepared by sieving coke with a sieve with a mesh size of 35 mm. The fine ratio of the coke fines of 1 mm or less adhering to the surface of the lump coke was computed as follows. The lump coke was dried at 120 to 200° C. for 4 hours or longer to constant weight and then sieved with a sieve with a mesh size of 1 mm, and the ratio of the difference in mass of the lump coke before and after sieving to the mass before sieving was computed. This method uses the fact that the adhering fines fall off in a dry state. The average brightness of the image data about the lump coke with the fines adhering thereto was computed by arithmetically averaging the brightness (0 to 255) of pixels in the image data captured by a digital camera under predetermined illumination.

As shown in FIG. 1, there is a high correlation between the fine ratio of the coke fines of 1 mm or less adhering to the lump coke and the average brightness of the image data for the lump coke, and the coefficient of determination ($R^2$) that measures the strength of the correlation was 0.67. Specifically, as can be seen, the fine ratio of the coke fines of 1 mm or less adhering to the lump coke strongly correlates with the average brightness of the lump coke image data.

Figure 2:
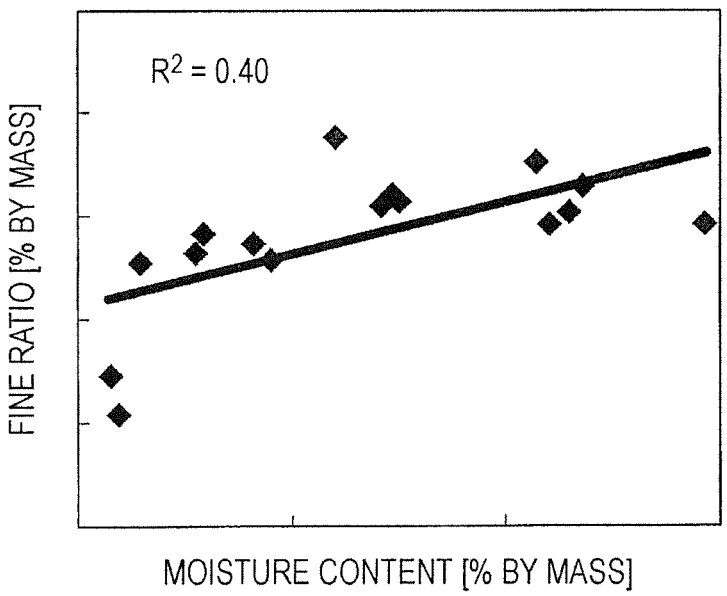
FIG. 2 is a graph showing the relation between the moisture content of the material in the form of lumps with the fines adhering thereto and the fine ratio.

FIG. 2 is a graph showing the relation between the moisture containment of the material in the form of lumps with the fines adhering thereto and the fine ratio. The same lump coke with the coke fines of 1 mm or less adhering its surface that was used for FIG. 1 was used for the measurement in FIG. 2. The vertical axis represents the fine ratio (% by mass) of the coke fines of 1 mm or less adhering to the lump coke, and the horizontal axis represents the moisture content (% by mass) of the lump coke with the coke fines of 1 mm or less adhering thereto. The fine ratio of the coke fines of 1 mm or less was computed by the same method as in FIG. 1. The water content of the lump coke was measured using a neutron moisture meter. As shown in FIG. 2, although there is a correlation between the fine ratio of the coke fines of 1 mm or less adhering to the lump coke and the moisture content of the lump coke, the coefficient of determination ($R^2$) that measures the strength of the correlation was 0.40.

As shown in FIGS. 1 and 2, the coefficient of determination for the correlation between the fine ratio of the coke fines of 1 mm or less adhering to the lump coke and the average brightness is higher than the coefficient of determination for the correlation between the fine ratio of the coke fines and the moisture content of the lump coke. Specifically, the correlation between the fine ratio of the coke fines of 1 mm or less adhering to the lump coke and the average brightness is stronger than the correlation between the fine ratio and the moisture content of the lump coke.

The reason that the correlation between the fine ratio of the coke fines and the average brightness of the image data is stronger than the correlation between the fine ratio of the coke fines and the moisture content of the lump coke is that the moisture content of the lump coke includes the content of moisture present on the surface of the lump coke and the content of moisture present inside the lump coke. Specifically, the moisture present on the surface of the lump coke is considered to strongly correlate with the fine ratio of the fines adhering to the surface of the lump coke, but the moisture present inside the lump coke is considered not to affect the fine ratio of the fines adhering to the surface of the lump coke. Therefore, the correlation between the moisture content of the lump coke and the fine ratio of the fines adhering to the surface of the lump coke is considered to be weakened by the influence of the moisture content inside the lump coke and is weaker than the correlation between the fine ratio and the average brightness. As described above, we found that there is a correlation between the fine ratio of the coke fines of 1 mm or less adhering to the lump coke and the average brightness. The fine ratio can be measured with higher accuracy than with the conventional fine ratio measuring method in which attention is given to the moisture content. Examples will next be described with reference to the drawings.

Figure 3:
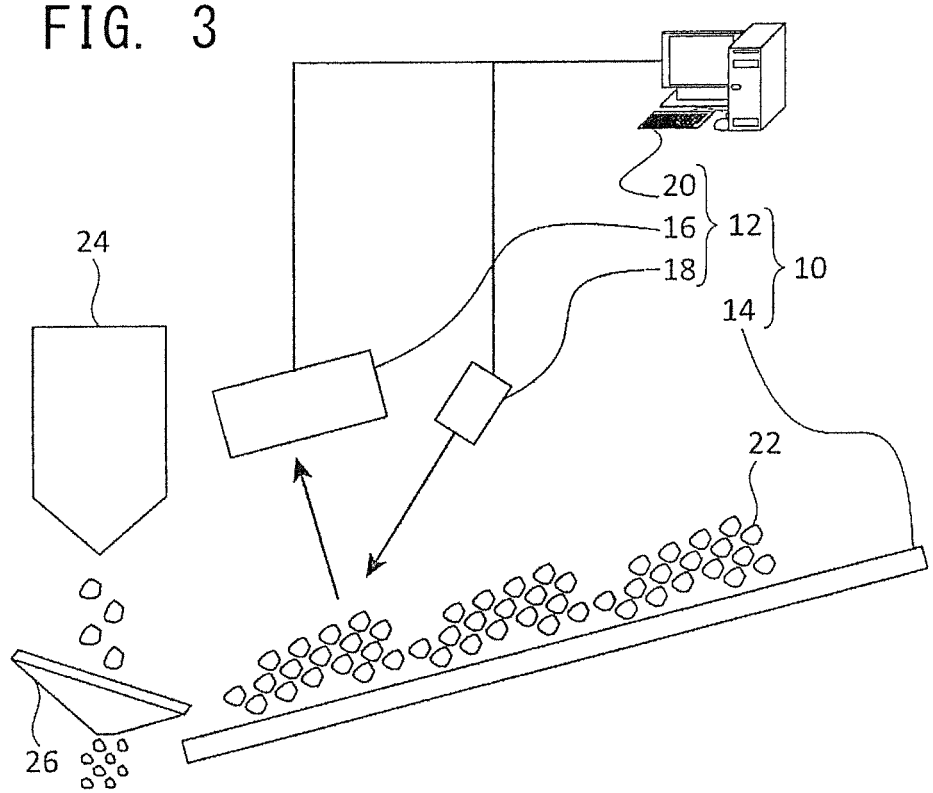
FIG. 3 is a schematic illustration showing an example of a fine ratio measuring system 10 and its peripheral configuration.

FIG. 3 is a schematic illustration showing an example of a fine ratio measuring system 10 according to an example and its peripheral configuration. Referring to FIG. 3, a description will be given of an example in which the fine ratio measuring system 10 is used to measure the fine ratio of fines adhering to coke used as a raw material to be charged into a blast furnace.

The fine ratio measuring system 10 includes a fine ratio measuring device 12 and a conveyor 14. The fine ratio measuring device 12 includes an imaging unit 16, an illumination unit 18, and an arithmetic unit 20. The coke 22 to be charged into the blast furnace is stored in a hopper 24. The coke 22 discharged from the hopper 24 is sieved with a sieve 26, and fines with a grain size smaller than the mesh size of the sieve 26 are thereby sieved out. Then the conveyor 14 conveys the resulting coke 22 to the blast furnace (not shown). In this example, the mesh size of the sieve 26 is 35 mm. Therefore, the coke 22 conveyed by the conveyor 14 contains the lump coke with a grain size of 35 mm or more and coke fines adhering to the lump coke not sieved through the sieve 26. The grain size of the coke fines adhering to the lump coke was measured, and the coke fines were found to have a grain size of 1 mm or less. In this example, the coke fines with a grain size of 1 mm or less means coke fines that have passed through the sieve with a mesh size of 1 mm, and the lump coke with a grain size of 35 mm or more means coke remaining on the sieve with a mesh size of 35 mm after sieving. In the example shown in FIG. 3, the coke 22 is an example of the material in the form of lumps.

The imaging unit 16 is disposed above the conveyor 14, captures an image of the coke 22 conveyed by the conveyor 14, and produces image data. The imaging unit 16 is, for example, a digital camera having a CCD or CMOS image sensor and a lens. The imaging unit 16 is placed above the conveyor 14 at a height of preferably from 500 mm to 1,000 mm. The height of the imaging unit 16 may be adjusted according to the number of pixels of the imaging sensor included in the imaging unit 16 and the angle of view of the lens.

The imaging sensor of the imaging unit 16 receives light including reflected light from the surface of the coke 22, and the imaging unit 16 produces image data. The coke fines adhering to the surface of the coke 22 affect the reflected light reflected from the surface of the coke 22. Therefore, the image data produced by receiving the light including the reflected light reflected from the surface of the coke 22 includes information about the coke fines adhering to the surface of the coke 22.

The image data produced by the imaging unit 16 is outputted to the arithmetic unit 20 including a computation unit and a conversion unit (not shown). The arithmetic unit 20 processes the image data outputted from the imaging unit 16. As described above, the image data contains the information about the coke fines adhering to the surface of the coke 22, and the computation unit of the arithmetic unit 20 computes a characteristic quantity including the information about coke fines from the image data. The computation unit computes, for example, an average brightness used as the characteristic quantity by arithmetically averaging the brightness (0 to 255) of pixels in the image data.

The average brightness computed by the computation unit is converted to the fine ratio of the adhering fines by the conversion unit. A regression formula representing the correspondence between the fine ratio of the coke fines adhering to the surface of the coke and the average brightness is stored in advance in the conversion unit, and the conversion unit uses the regression formula to convert the average brightness computed by the computation unit to the fine ratio of the coke fines adhering to the surface of the coke 22.

After a lapse of a predetermined time, the imaging unit 16 again captures an image of the coke 22 and produces image data. The predetermined time may be set according to, for example, the area of the image of the coke 22 captured by the imaging unit 16 and the conveyance speed of the conveyor 14. Specifically, the predetermined time may be the time computed by dividing the length of the image area in the conveyance direction of the conveyor 14 by the conveyance speed of the conveyor 14. In this manner, the imaging unit 16 can capture images of the coke 22 with no gaps in the conveying direction of the conveyor 14. Preferably, the imaging unit 16 captures the images of the coke 22 from a direction perpendicular to the conveying direction of the conveyor 14.

The image data produced by the imaging unit 16 is again outputted to the arithmetic unit 20, and the fine ratio of the coke fines adhering to the coke 22 is computed in the arithmetic unit 20. In the fine ratio measuring device 12 in this example, the above-described processing is repeatedly executed, and the fine ratio of the coke fines adhering to the surface of the coke 22 conveyed by the conveyor 14 is thereby measured in real time.

As described above, with the fine ratio measuring device 12 in this example, the fine ratio of the coke fines adhering to the surface of the coke 22 to be charged as a raw material into the blast furnace can be measured in real time with high accuracy. The fine-grained coke fines adhering to the coke 22 affect, for example, the ventilation in the blast furnace. However, the real time measurement allows the amount of the coke fines charged into the blast furnace to be controlled, and this can contribute to stable operation of the production process in the blast furnace.

The fine ratio measuring device 12 can measure the fine ratio of the coke fines adhering to the surface of the coke 22 without measuring the grain size of the coke fines. Therefore, even when the number of pixels of the imaging sensor of the imaging unit 16 is so small that the grain size of the coke fines cannot be determined, the fine ratio of the coke fines adhering to the coke 22 can be measured. The imaging unit 16 receives light in the visible range without spectral analysis and then produces the image data. Therefore, sufficient reflected light can be obtained even from a low-power illumination unit, and the material to be charged is prevented from being heated by a high-power illumination unit.

In the example shown above, the characteristic quantity computed in the fine ratio measuring device 12 is the average brightness, but this is not a limitation. For example, the computation unit may compute a modal brightness as the characteristic quantity, and the characteristic quantity may be a texture feature extracted from the distribution of the brightness of the pixels in the image data.

Figure 4:
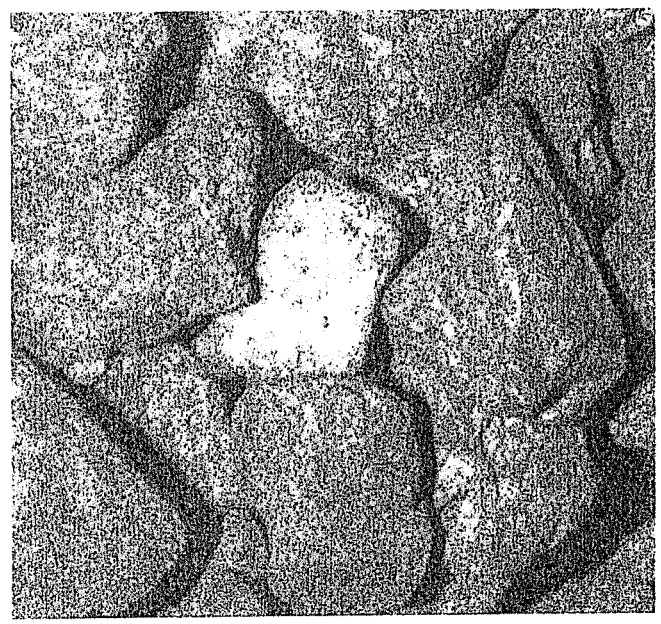
FIG. 4 shows an example of an image with blown out highlights.

FIG. 4 shows an example of an image with blown out highlights. An image with blown out highlights such as the image shown in FIG. 4 may be obtained depending on the positional relation between the illumination unit and the raw material, and the information about the adhering fines is not obtained from the blown out highlights.

Figure 5:
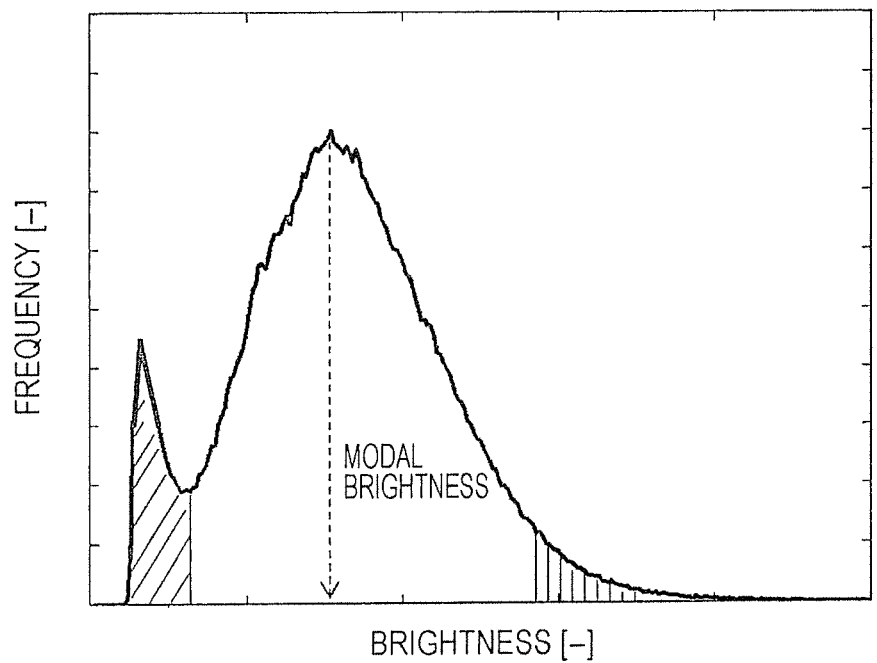
FIG. 5 shows a brightness histogram of the image with blown out highlights shown in FIG. 4.

FIG. 5 shows a brightness histogram of the image with the blown out highlights shown in FIG. 4. The average brightness is disturbed by both a low-brightness portion (a shaded portion on the low brightness side) corresponding to shadows and a high-brightness portion (a shaded portion on the high brightness side) corresponding to the blown out highlights, and the measurement accuracy is low. Therefore, the most frequent brightness (modal brightness) in the image data may be used as a characteristic quantity that is not disturbed by these portions.

Figure 6:
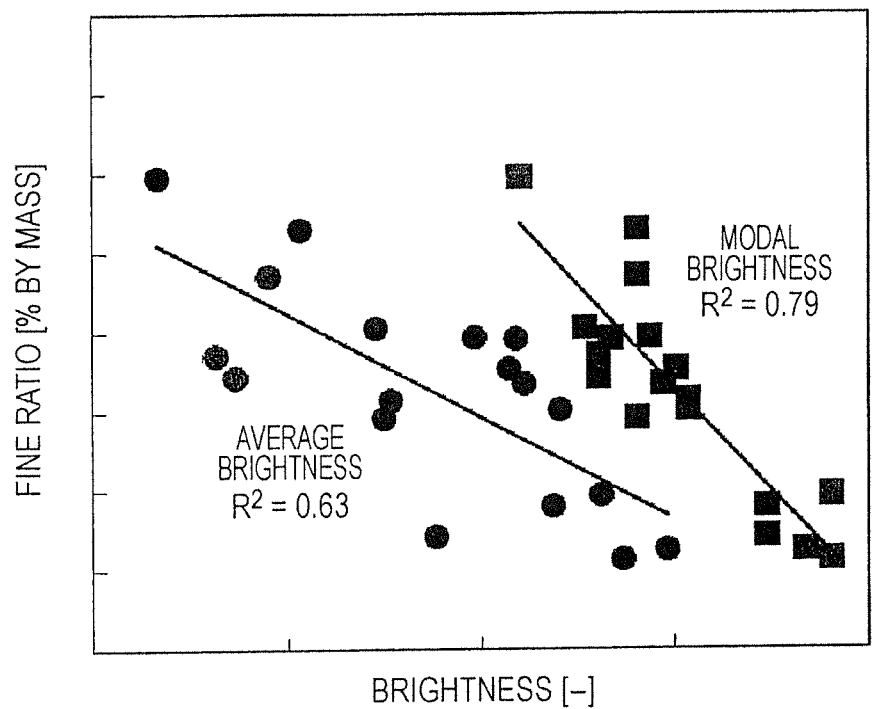
FIG. 6 is a graph showing the relation between an average brightness and the fine ratio and the relation between a modal brightness and the fine ratio.

FIG. 6 is a graph showing the relation between the average brightness and the fine ratio and the relation between the modal brightness and the fine ratio.

The coefficient of determination ($R^2$) computed from a linear regression line representing the relation between the average brightness and the fine ratio is compared with the coefficient of determination ($R^2$) computed from a linear regression line representing the relation between the modal brightness and the fine ratio. Although the coefficient of determination for the average brightness is 0.63, the coefficient of determination for the modal brightness is 0.79. This shows that the correlation between the modal brightness and the fine ratio is stronger than the correlation between the average brightness and the fine ratio. As can be seen from these results, when an image with blown out highlights is captured, the accuracy of measurement of the fine ratio is higher when the modal brightness is used as the characteristic quantity than when the average brightness is used as the characteristic quantity.

An image of the conveyor 14 whose brightness value is comparable to the brightness of the coke 22 may be captured depending on the amount of the coke 22 conveyed. The brightness of the conveyor also disturbs the measurement of the fine ratio. When the image of the conveyor 14 is captured, a brightness peak of the conveyor 14 may be formed in the histogram. When the modal brightness is used as the characteristic quantity, the modal brightness of the conveyor 14 in the brightness histogram may be used as the characteristic quantity, and this may causes a reduction in the measurement accuracy. However, the average brightness is less affected by the brightness of the conveyor 14. Therefore when the amount of the conveyed coke is small and reflection from the conveyor 14 is large, the accuracy of the measurement of the fine ratio is higher when the average brightness is used as the characteristic quantity than when the modal brightness is used as the characteristic quantity.

As described above, the fine ratio of the coke fines adhering to the coke 22 conveyed by the conveyor 14 can be computed using the brightness in the image data such as the average brightness or the modal brightness. The fine ratio of the coke fines adhering to the coke 22 conveyed by the conveyor 14 can be measured with high accuracy by properly using the average brightness or the modal brightness according to the image captured.

Figure 7A:
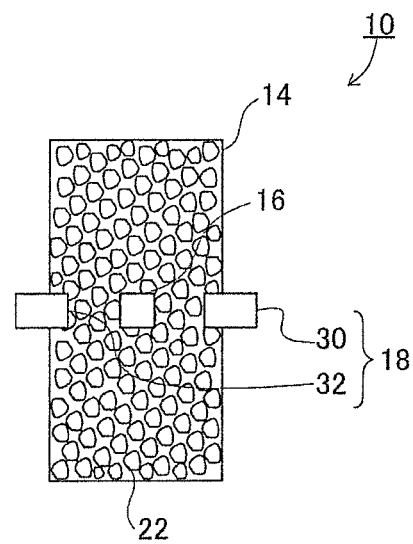
FIGS. 7A and 7B show illustrations of an example of an illumination unit 18.
Figure 7B:
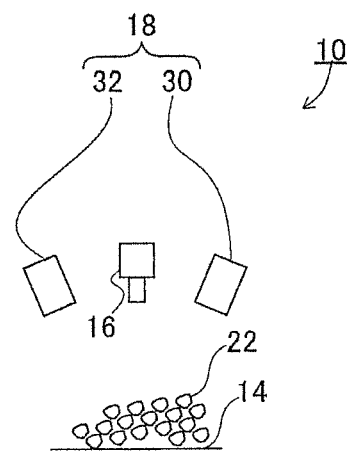

Next, the illumination unit 18 will be described. FIGS. 7A and 7B show illustrations of an example of the illumination unit 18. FIG. 7A is a top view of the fine ratio measuring system 10. FIG. 7B is a front view of the fine ratio measuring system 10. In the example shown in FIGS. 7A and 7B, the illumination unit 18 includes two light sources 30 and 32 that are disposed at symmetric positions equally spaced in the left-right direction from the imaging unit 16 serving as the center.

When one light source is used to illuminate the coke 22 from one direction, shadows are formed on the side opposite to the light source. The amount of light reflected from the shadows in the coke 22 is small irrespective of the fine ratio of the coke fines adhering to the coke 22. Therefore, the shadows formed in the coke 22 are a disturbance factor for the measurement of the fine ratio of the coke fines.

As shown in FIGS. 7A and 7B, the light sources 30 and 32 may be disposed at symmetric positions equally spaced from the imaging unit 16 serving as the center. In this example, shadows formed when one light source is used for illumination from one direction can be reduced, and the accuracy of the measurement of the fine ratio of the coke fines adhering to the coke 22 can be improved.

Figure 8A:
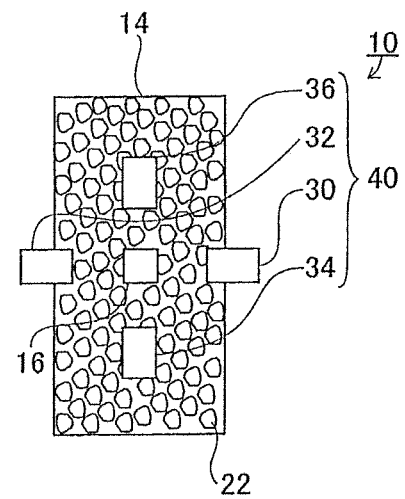
FIGS. 8A-8C show illustrations of an example of an illumination unit 40.
Figure 8B:
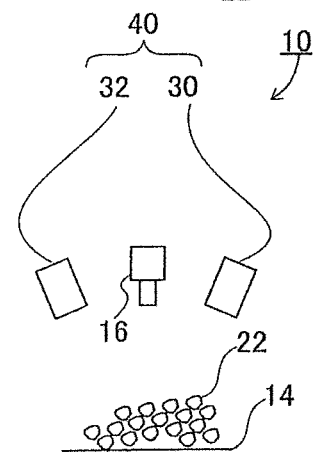
Figure 8C:
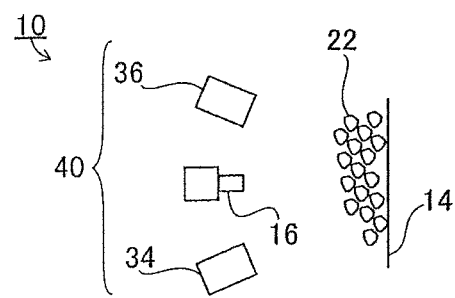

The number of light sources of the illumination unit 18 is not limited to two. FIGS. 8A-8C show illustrations of an example of an illumination unit 40. FIG. 8A shows a top view of a fine ratio measuring system 10. FIG. 8B shows a front view of the fine ratio measuring system 10. FIG. 8C shows a side view of the fine ratio measuring system 10.

In the example shown in FIGS. 8A, 8B, and 8C, the illumination unit 40 includes four light sources 30, 32, 34, and 36 disposed at symmetric positions equally spaced in the forward-rearward and left-right directions from the imaging unit 16 serving as the center. When the illumination unit 40 including the four light sources equally spaced from the imaging unit 16 serving as the center and having different illumination directions is used to illuminate the coke 22, shadows formed in the coke 22 can be smaller than those when the two light sources disposed at symmetric positions equally spaced from the imaging unit 16 serving as the center is used. In this example, the accuracy of the measurement of the fine ratio of the coke fines adhering to the coke 22 can be further improved.

In the example shown in FIGS. 8A-8C, all the four light sources may be used to illuminate the coke 22. However, the four light sources may be used individually, and the imaging unit 16 may capture an image each time the light source used is changed to thereby produce four sets of image data. In this example, the computation unit produces maximum brightness image data using the four sets of image data.

The computation unit identifies pixels in the four sets of image data that have been produced by receiving light from the same position of the coke 22. The computation unit may identify the pixels in the four sets of the image data that have been produced by receiving light from the same position of the coke 22 by multiplying an imaging interval of the imaging unit 16 by the conveyance speed of the conveyor 14 to compute a positional shift of the pixels in the four sets of image data. Alternatively, the computation unit may identify the pixels in the four sets of the image data that have been produced by receiving light from the same position of the coke 22 by subjecting the four sets of image data to pattern matching. The computation unit extracts a pixel with the highest brightness from the four identified pixels. The computation unit repeats the same processing for all pixels included in an imaging region of the coke 22 shared by the four sets of image data to thereby produce maximum brightness image data including the extracted pixels with the maximum brightness values. The average brightness may be computed using the maximum brightness image data.

The four light sources 30, 32, 34, and 36 may be grouped into, for example, a group including the light sources 30 and 32 and a group including the light sources 34 and 36, and the imaging unit 16 may capture an image each time the light source group used is changed to thereby produce image data. Then the two sets of image data obtained using the two light source groups for illumination may be used to produce maximum brightness image data, and the maximum brightness image data may be used to compute the average brightness.

Figure 9A:
FIGS. 9A and 9B show examples of an image of coke 22 illuminated by the illumination unit.
Figure 9B:
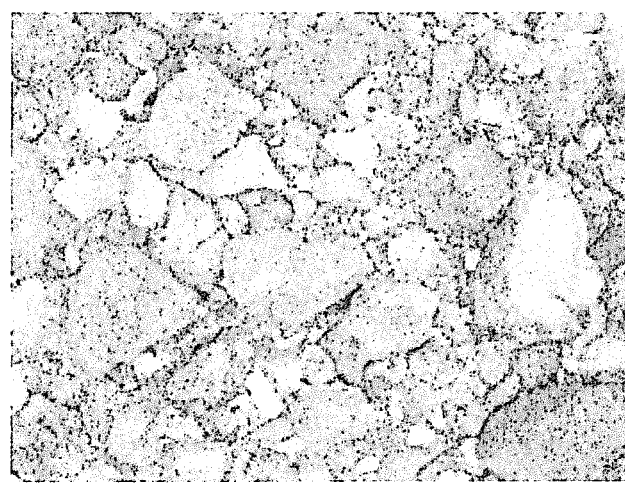

FIGS. 9A and 9B show examples of an image of the coke 22 illuminated by the illumination unit. FIG. 9A shows an image of the coke 22 illuminated from a direction of an arrow 42. FIG. 9B shows a maximum brightness image produced using four sets of image data produced using the four light sources equally spaced in the forward-rearward and left-right directions from the imaging unit 16 serving as the center, the four sets of image data being produced by capturing an image each time the light source used is changed.

As shown in FIG. 9A, in the image of the lump coke illuminated from the direction of the arrow 42, a shadow 44 is formed in the coke 22. However, as shown in FIG. 9B, with the maximum brightness image data, the shadow 44 formed in the coke 22 can be reduced. As described above, by using the maximum brightness image data, the disturbance factor caused by the direction of illumination can be reduced, and the fine ratio of the coke fines can be measured with high accuracy.

In this example, the coke 22 is shown as the example of the material in the form of lumps, but this is not a limitation. For example, the material in the form of lumps may be any of the raw materials charged into the blast furnace. Instead of the coke 22, lump ore or small lump coke obtained by sieving lump coke to obtain coke sieved through the sieve and then removing fines from the obtained coke by sieving may be used, or sintered ore or pellets may be used.

In the example shown in FIGS. 8A-8C, the illumination unit 40 having the four light sources is used to produce four sets of image data, and the image data is used to produce the maximum brightness image data. However, the number of light sources and the number of sets of image data are not limited to four. The number of light sources disposed may be any number not less than two, and the number of sets of image data produced and used to produce the maximum brightness image data may be any number not less than two and not more than the number of light sources.

The light sources 30, 32, 34, and 36 may be light sources that can illuminate the coke 22 continuously or may be light sources such as electronic flashes that can illuminate the coke 22 instantaneously. When a plurality of light sources are used individually, electronic flashes that can output a large amount of light instantaneously are more preferred. In the example shown above, the light sources are equally spaced from the imaging unit 16 serving as the center, but this is merely a preferred example. The light sources may be disposed at any positions.

The invention claimed is:

1. A fine ratio measuring device that measures a fine ratio of fines adhering to a surface of a material in the form of lumps, the fine ratio measuring device comprising:
   an illumination unit that illuminates the material in the form of lumps;
   an imaging unit that captures an image of the material in the form of lumps and then produces image data; and
   an arithmetic unit that computes a characteristic quantity of the image data produced by the imaging unit and converts the characteristic quantity to the fine ratio.

2. The fine ratio measuring device according to claim 1, wherein the characteristic quantity is an average brightness obtained by averaging brightness of pixels in the image data.

3. The fine ratio measuring device according to claim 1, wherein the characteristic quantity is a modal brightness that is a most frequent brightness in pixels in the image data.

4. The fine ratio measuring device according to claim 1, wherein the illumination unit includes a plurality of light sources with different illumination directions.

5. The fine ratio measuring device according to claim 2, wherein the illumination unit includes a plurality of light sources with different illumination directions.

6. The fine ratio measuring device according to claim 3, wherein the illumination unit includes a plurality of light sources with different illumination directions.

7. The fine ratio measuring device according to claim 4, wherein the imaging unit captures an image of the material in the form of lumps each time the material is illuminated using the plurality of light sources from at least one of the directions thereof to thereby produce a plurality of sets of image data, and the arithmetic unit produces maximum brightness image data and computes the characteristic quantity using the maximum brightness image data, the maximum brightness image data including data about maximum brightness pixels in the plurality of sets of image data, each of the maximum brightness pixels being selected from pixels produced by receiving light from an identical position of the material in the form of lumps.

8. The fine ratio measuring device according to claim 5, wherein the imaging unit captures an image of the material in the form of lumps each time the material is illuminated using the plurality of light sources from at least one of the directions thereof to thereby produce a plurality of sets of image data, and the arithmetic unit produces maximum brightness image data and computes the characteristic quantity using the maximum brightness image data, the maximum brightness image data including data about maximum brightness pixels in the plurality of sets of image data, each of the maximum brightness pixels being selected from pixels produced by receiving light from an identical position of the material in the form of lumps.

9. The fine ratio measuring device according to claim 6, wherein the imaging unit captures an image of the material in the form of lumps each time the material is illuminated using the plurality of light sources from at least one of the directions thereof to thereby produce a plurality of sets of image data, and the arithmetic unit produces maximum brightness image data and computes the characteristic quantity using the maximum brightness image data, the maximum brightness image data including data about maximum brightness pixels in the plurality of sets of image data, each of the maximum brightness pixels being selected from pixels produced by receiving light from an identical position of the material in the form of lumps.

10. A fine ratio measuring system comprising:
the fine ratio measuring device according to claim 1; and
a conveyor that conveys the material in the form of lumps, the fine ratio measuring device being disposed above the conveyor,
wherein the fine ratio measuring device is used to measure the fine ratio of the fines adhering to the surface of the material in the form of lumps.

11. A fine ratio measuring system comprising:
the fine ratio measuring device according to claim 2; and
a conveyor that conveys the material in the form of lumps, the fine ratio measuring device being disposed above the conveyor,
wherein the fine ratio measuring device is used to measure the fine ratio of the fines adhering to the surface of the material in the form of lumps.

12. A fine ratio measuring system comprising:
the fine ratio measuring device according to claim 3; and
a conveyor that conveys the material in the form of lumps, the fine ratio measuring device being disposed above the conveyor,
wherein the fine ratio measuring device is used to measure the fine ratio of the fines adhering to the surface of the material in the form of lumps.

13. A fine ratio measuring system comprising:
the fine ratio measuring device according to claim 4; and
a conveyor that conveys the material in the form of lumps, the fine ratio measuring device being disposed above the conveyor,
wherein the fine ratio measuring device is used to measure the fine ratio of the fines adhering to the surface of the material in the form of lumps.

14. A fine ratio measuring system comprising:
the fine ratio measuring device according to claim 5; and
a conveyor that conveys the material in the form of lumps, the fine ratio measuring device being disposed above the conveyor,
wherein the fine ratio measuring device is used to measure the fine ratio of the fines adhering to the surface of the material in the form of lumps.

15. A fine ratio measuring system comprising:
the fine ratio measuring device according to claim 6; and
a conveyor that conveys the material in the form of lumps, the fine ratio measuring device being disposed above the conveyor,
wherein the fine ratio measuring device is used to measure the fine ratio of the fines adhering to the surface of the material in the form of lumps.

16. A fine ratio measuring system comprising:
the fine ratio measuring device according to claim 7; and
a conveyor that conveys the material in the form of lumps, the fine ratio measuring device being disposed above the conveyor,
wherein the fine ratio measuring device is used to measure the fine ratio of the fines adhering to the surface of the material in the form of lumps.

17. A fine ratio measuring system comprising:
the fine ratio measuring device according to claim 8; and
a conveyor that conveys the material in the form of lumps, the fine ratio measuring device being disposed above the conveyor,
wherein the fine ratio measuring device is used to measure the fine ratio of the fines adhering to the surface of the material in the form of lumps.

18. A fine ratio measuring system comprising:
the fine ratio measuring device according to claim 9; and
a conveyor that conveys the material in the form of lumps, the fine ratio measuring device being disposed above the conveyor,
wherein the fine ratio measuring device is used to measure the fine ratio of the fines adhering to the surface of the material in the form of lumps.

* * * * *